United States Patent
Zucker

[11] Patent Number: 5,962,161
[45] Date of Patent: Oct. 5, 1999

[54] RECOMBINANT BATTERY SEPARATOR

[75] Inventor: Jerry Zucker, Charleston, S.C.

[73] Assignee: Daramic, Inc.

[21] Appl. No.: 09/003,653

[22] Filed: Jan. 7, 1998

Related U.S. Application Data

[63] Continuation-in-part of application No. 08/783,219, Jan. 14, 1997, abandoned.

[51] Int. Cl.⁶ ...................................................... H01M 2/16

[52] U.S. Cl. ........................... 429/142; 429/250; 429/254

[58] Field of Search .................................... 429/254, 250, 429/142

[56] References Cited

U.S. PATENT DOCUMENTS 3,847,676  11/1974  Palmer et al. ...................... 429/250 X
3,972,759   8/1976  Buntin .

*Primary Examiner*—John S. Maples
*Attorney, Agent, or Firm*—Juettner Pyle Piontek & Underwood

[57] ABSTRACT

A recombinant battery separator pad is made from a mat of meltblown ultrafine polymer fibers, with the fibers being treated with an agent to render them permanently wettable. The fibers include at least ten percent of less than one micron, with the majority less than five microns. The mat has a liquid porosity of at least 90% and a surface area of at least 1.0 $m^2/g$.

11 Claims, No Drawings

RECOMBINANT BATTERY SEPARATOR

CROSS REFERENCE

This is a continuation-in-part of application Ser. No. 08/783,219, filed Jan. 14, 1997, now abandoned.

BACKGROUND OF THE INVENTION

This invention relates to porous separators which are disposed between the electrode plates of a battery.

Storage batteries include a plurality of electrode plates which are arranged to provide alternating positive and negative electrodes. The separators are made from an insulating porous material and hold battery electrolyte, such as acid, and allow passage of ionic current between the plates.

Battery separators in general must possess certain properties. The separator medium must be resistant to degradation and instability in the environment of the battery, such as degradation by strong acid solutions at ambient and elevated temperatures and strong oxidative attacks. The separator should also be capable of allowing a high degree of ionic movement or should have a low electrical resistance. The separator should also be capable of inhibiting the formation of conductive paths between plates and consequent shorting. This latter problem can arise during battery operation when parts of the battery electrode become dispersed in the electrolyte and precipitate or become deposited in the separator.

Flooded cell lead acid batteries have been in general use for many years. In such batteries, the separators employed typically have a fixed thickness. These type of separators are not highly porous and do not absorb significant amounts of acid. They serve primarily to prevent migration of particles and typically have ribs to physically separate or space the electrodes in the cell.

A recently developed electrochemical cell is commonly referred to as a sealed or valve regulated recombinant design. In certain types of recombinant batteries, the reservoir of electrolyte is completely contained or absorbed by the separator media, and the separator is in full contact with adjacent electrodes and fills the entire space between the electrodes.

Battery separators of the recombinant type must have a degree of empty void volume to permit transport of oxygen gas generated at the positive electrode, during charging or overcharging, to the negative electrode where such gas is reduced. In lead-acid batteries, generated oxygen must pass from the positive electrode through the separator to the surface of the negative electrode, which is damp with sulfuric acid. The oxygen then combines with the lead to form lead oxide, which is in turn converted to lead sulfate and free water.

To achieve the above properties, it is known to employ a mat or felt of borosilicate glass microfibers as the separator media. These separators generally comprise a blend of glass fibers of varying length and diameter. GB patent no. 1,364,283 describes a separator medium made up of fine glass fibers. The fiber mat has a small pore size and provides a very high volume retentivity of electrolyte per unit volume of separator. The capillarity of the mat retains the electrolyte stably within the separator. The mat is designed to be saturated with liquid electrolyte to about 85–95 percent of the available void volume, with the remaining void volume being open to allow gas transfer.

Separators containing submicron glass fibers have several disadvantages which have not been adequately resolved. Health concerns have been expressed about extremely fine fibers of this nature. Glass fiber mats are difficult to process on high speed production equipment due to poor mechanical properties, and they tend to release airborne particles.

Several early proposals were made to use meltblown fibers to make battery separators for conventional flooded cell acid batteries. U.S. Pat. Nos. 3,847,676, 3,972,759 and 4,165,351 all disclose the formation of battery separators from fine meltblown fibers. The fibers are rendered wettable by the addition of internal or external surfactants. In all cases, the mat is permanently compressed, usually by use of heat and pressure, in order to make the pad rigid and to reduce pore size to an acceptable level.

Up to the present time, however, the only material available for use in lead acid batteries of the recombinant type have been mats made of the aforementioned fine glass fibers. Mats made from the meltblown polymers described in the above references are not suitable because of their low porosity, large pore size even when compressed, and inability to completely absorb the acid electrolyte while retaining an empty void volume capable of transmitting gas between electrodes.

SUMMARY OF THE INVENTION

In accordance with the present invention, a battery separator pad uniquely suitable for batteries of the recombinant or sealed type is made from extremely fine meltblown fibers self-bonded in a cohesive, uncompressed mass. At least 10% of the fibers have a diameter of less than one micron, and a majority of the fibers have a diameter of less than five microns. In order to obtain a mat of polymeric fibers suitable for use in recombinant batteries, the surface area of the fibers in the mat exceeds 1.0 $m^2/g$. Also, the mat, which is not permanently compressed, has a porosity of greater than 90% and a mean pore size of from about five to about fifteen microns.

The fiber mat is treated in order to render it wettable by battery acid. This may be accomplished by addition of a suitable surface active agent to the polymer prior to extrusion, or by covalently bonding hydrophilic groups to the surface of the fibers after formation.

Unlike meltblown battery separators of the prior art, the separator of the present invention completely wicks and absorbs the acid electrolyte over its entire dimensions and completely fills the space between electrodes.

DETAILED DESCRIPTION

The substrate of the recombinant battery separator of the present invention is formed using a conventional melt blowing apparatus. Such an apparatus typically includes pressurized, heated die through which a plurality of filaments of molten thermoplastic polymer are extruded. The die also uses heated and pressurized air flowing in the direction of extrusion to attenuate the molten polymer upon exit from the orifices. The fibers are continuously deposited on a moving conveyor to form a consolidated flat web of desired thickness, which may be cut into the desired shape.

The construction and operation of a melt blowing apparatus for forming a coherent mat are considered conventional, and the design and operation are well within the ability of those skilled in the art. Suitable apparatus and methods are described in U.S. Pat. No. 3,849,241 and U.S. Pat. No. 3,972,759, incorporated herein by reference.

The polymers used to make the substrate include thermoplastic polymers capable of being melt extruded into a submicron size diameter, and resistant to strong acids. Potential candidates include polystyrene, polyamides, polyesters and polyolefins, but polypropylene is preferred.

Several approaches are available in the selection of a suitable resin. So-called metallocene polypropylene resins, produced by single-site catalysis, have a narrow distribution of molecular weight. A conventional polypropylene resin may be treated with known viscosity reducing agents such as peroxides. Also, untreated resins having melt flow rates greater than 1000 and preferably greater than 1200 may be employed.

In order to achieve submicron diameters and high surface area, the processing conditions must be optimized for the particular resin employed. For conventional polypropylene resins having a high MFR, the temperature of the attenuating air must be greater than the temperature of the polymer melt, and preferably at least 15° C. higher. The rate of flow of the attenuating air may be increased from normal levels until ultrafine fibers are produced. Also, the thruput of the resin may be reduced from normal, with the normal rate usually being one gram/hole/minute.

From the above considerations, a person skilled in the art will be able to prepare a meltblown web, or mat of uniform thickness, with a distribution of fiber sizes which are necessary for a recombinant battery separator. The web or mat of fibers must contain at a minimum at least about 10% fibers having diameters of less than one micron and preferably 5% less than 0.5 micron. Most preferably, the web will contain more than 15% fibers having diameters of less than one micron. Also, the average fiber diameter of fibers in the web will be less than 5 microns, and more than 60% of the web will have fibers with diameters less than 5 microns.

The thickness and the basis weight of the meltblown web as produced will depend on the particular design of the battery. The thickness may vary widely, for example, from 5 to 200 mils, with a basis weight in the order of 16 to 660 grams per square meter.

The fiber size distribution and the essential properties of the meltblown mat are determined by standard test procedures. In order to be suitable for use in a recombinant battery the mat will have a liquid porosity of greater than 87% and preferably greater than 90%. Despite the high porosity, the mat will have a mean pore diameter in the order of 5 to 15 microns and preferably in the order of 8 to 12 microns. Due to the relatively high proportion of ultrafine fibers, the surface area of the fibers in the mat is greater than 1.0 m$^2$/g, allowing for effective wicking of the electrolyte, whereby the electrolyte is substantially uniformly distributed throughout the volume of the separator.

The mat is employed in uncompressed form and the thickness is not altered by any procedure such as heating under compression. It may be desirable to provide a mat which is slightly thicker than the space between electrodes in order to assure good contact with the electrode surfaces, but no permanent pre-compression is involved.

While the meltblown web may be simply cut into flat pieces and used as such, additional forms are envisioned. For example, the web may be reinforced with one or more thin layers of spunbond fabric. Also, pieces of the fabric can be thermally bonded together around three edges to form a pocket which is then applied over an electrode to cover both sides.

The meltblown fabric is treated to render it wettable by battery acid. One suitable method is to incorporate an internal additive into the molten polymer before it is extruded into fibers. These additives are resistant to strong acids and may be added at levels of from about 0.5 to 5 percent by weight. Some suitable additives which have been identified include polytetrahydrafuran, mono and diglycerides from fatty acids, and dimethylsilicone oxyalkylene copolymers. The additives are preferably not added to the polymer directly but are preferably preformed into pellets with the polymer. For example, 25% of the additive may be mixed with 75% polypropylene and extruded into filaments. The filaments are allowed to cool and chopped into micropellets. Then, about 5 to 20% of the micropellets are added to pure polypropylene pellets and fed to an extruder and through the melt blowing apparatus. The surface active agent tends to migrate toward and coat the surface of the fiber, rendering it wettable by acid.

Another method is to alter the surface of the fiber to render it wettable. As an example, a hydrophilic polymer may be chemically bonded to the surface of the fiber. This may be accomplished by graft polymerizing of the substrate with a hydrophilic monomer, such as an acrylic or methacrylic monomer having alcohol functional groups, with the energy for the reaction being furnished by radiation.

In accordance with one preferred embodiment, a hydrophilic compound such as polyvinyl pyrrolidone or polyacrylamide is immobilized on the surface of the fibers. The hydrophilic agent is either photoactivatible itself or is combined with a photoactivatible cross linking agent. The agent is coated onto the substrate and irradiated. Various compounds of this nature are available from BSI Corporation, Eden Prairie, Minn. See, for example, U.S. Pat. No. 5,414,075, incorporated by reference. In this embodiment, the hydrophilic polymer is covalently bonded to the meltblown substrate and is hydrolytically stable.

Other treatments to surfaces of polyolefin articles and fibers have been suggested to render them hydrophilic or wettable. These include techniques to render the surface rough or porous such as by treatment with a plasma or corona discharge.

It has been found that topical application of surfactants to the separator pads of the present invention is not acceptable. In evaluating this approach, it has been found that topical surfactants, even if they are not washed away or chemically degraded, usually cause formation of bubbles in the empty void space and may prevent transmission of gas.

The following are examples of treatments of meltblown polypropylene fabrics to render them permanently wettable.

EXAMPLE 1

Meltblown polypropylene (PP) mat was made wettable using the photoactivatible crosslinker, PR03 (provided by BSI Corporation) to immobilize polyvinyl pyrrolidone (PVP, BASF K30). PR03 at 0.35g/l and PVP at 2.0 g/l was dissolved 0.8% v/v hexanol in water. Meltblown PP was saturated with this solution and processed once on each side through on a conveyor belt at 30.5 cm per minute, under a Fusion Systems light source which was 8.9 cm from the mat. The Fusion System light source P-300, with 300 watt/inch d bulb. The treated mat was then dried in a convection oven until it reached 100 C. This treatment resulted in mat that completely saturated with water and wicked 2.5 cm above vertical dip grade in 6.8 seconds.

EXAMPLE 2

Meltblown PP mat was made wettable using the photoactivatible PVP (PV03 which was provided by BSI Corporation) reagent. PV03 was dissolved at 1.0 g/l in 75% water and 25% Isopropanol (IPA). The mat was saturated with said reagent and illuminated for 60 seconds using two Dymax lamps (PC-2, 400 watt metal halide/mercury vapor bulbs) 15 cm from the mat on each side. The treated mat was allowed to air dry. This treatment resulted in a mat that completely saturated with water and wicked 5 cm above vertical dip grade in 28 seconds.

EXAMPLE 3

Meltblown PP mat was made wettable using the photoactivatible PVP (PV05 which was provided by BSI Corporation) reagent. PV05 was dissolved at 1.0 g/l in 0.8% v/v hexanol in water. Meltblown PP mat was saturated with this solution and processed once on each side through a conveyor belt at 61 cm per minute, under a Fusion Systems light source which was 8.9 cm from the mat. The Fusion System light source P-300, with 300 watt/inch H bulb. An alternative light source is a pulsed UV Xenon bulb. The treated mat was then dried in a convection oven until it reached 100 C. This treatment resulted in a mat that completely saturated with water and wicked 5 cm in 51 seconds.

EXAMPLE 4

Meltblown PP mat was made wettable in the same manner as example 1 except by changing the parameters listed in the following table. The resultant wetting characteristics are listed per each set of parameters:

| PVP (g/l) | PR03 (g/l) | Oven Temp (degree C.) |
|---|---|---|
| 4 | 0.50 | 100 |
| 2 | 0.38 | 100 |
| 2 | 0.25 | 100 |
| 5 | 0.75 | 125 |
| 2 | 0.75 | 100 |
| 5 | 0.75 | 100 |
| 2 | 0.25 | 100 |
| 3 | 0.50 | 100 |
| 2 | 0.38 | 100 |
| 2 | 0.50 | 100 |

| Wick Time to 2.5 cm (seconds) | Wick Time to 5 cm (seconds) |
|---|---|
| 10 | 35 |
| 9 | 37 |
| 10 | 35 |
| 9 | 30 |
| 6.5 | 27.5 |
| 6.5 | 26.5 |
| 7.0 | 28.5 |
| 8.0 | 31.0 |
| 7.8 | 31.0 |
| 6.5 | 27.5 |

All samples listed in the aforementioned table resulted in a mat that completely saturated with water.

EXAMPLE 5

Meltblown PP mat was made wettable using the photoactivatible PVP (PV03 which was provided by BSI Corporation) reagent. PV03 was dissolved at 1.0 g/l in water. The mat was pretreated with an oxygen plasma at 100 watts for 3 minutes on each side and then saturated with said reagent and illuminated for 4 minutes using two Dymax lamps (PC-2, 400 watt metal halide/mercury vapor bulbs) 15.2 cm from the mat on each side. The treated mat was allowed to air dry. This treatment resulted in a mat that completely saturated with water.

EXAMPLE 6

Meltblown PP mat was made wettable as described in example 5, except that photoactivatible Polyacrylamide (PA04 which was provided by BSI Corporation) was used as a reagent in 1.0 g/l in water.

EXAMPLE 7

Meltblown polypropylene (PP) mat was made wettable using the photoactivatible crosslinker, PR03 (provided by BSI Corporation) to immobilize polyvinyl pyrrolidone (PVP, BASF K90). PR03 at 0.25 g/l and PVP at 2.0 g/l was dissolved 25% IPA in water. Meltblown PP was saturated with this solution and processed once on each side through on a conveyor belt at 152 cm per minute, under a Fusion Systems light source which was 3.5 inches from the mat. The Fusion System light source P-300, with 300 watt/inch H bulb. The treated mat was then allowed to air dry. This treatment resulted in mat that completely saturated with water and wicked 5 cm in 66 seconds.

EXAMPLE 8

Poly(tetra hydrafuran) [BASF polyTHF 2000] 25% by weight, was mixed with high melt flow poly(propylene). The mixture was fed into a single screw extruder and filaments were drawn of the mixture. The filaments were allowed to cool in the air and then were chopped into micropellets. The polyTHF concentrate, 20% by weight, was then mixed into more high melt flow poly(propylene) and feed into another extruder. This extruder was equipped with a meltblown die and polypropylene mat was formed. The resultant mat had fine denier and completely saturated with water and acid.

EXAMPLE 9

Humko Chemical of American Ingredience, Atmul 124 [mono and diglycerides from fatty acids] were added, 25% by weight, to polypropylene. The material was mixed and extruded into filaments using a single screw extruder. After cooling in air the polymer filaments were chopped into micropellets. The Atmul 124 concentrate pellets, 5–10% by weight, were then mixed with high melt flow poly (propylene) powder and meltblown mat was formed. The resultant mat had fine denier and completely saturated with water.

EXAMPLE 10

PPG's Masil SF 19® [dimethylsilane onyalkylene copolymer] additive was added, 25% by weight, to polypropylene. The material was mixed and extruded into filaments using a single screw extruder. After cooling in air the polymer filaments were chopped into micropellets. The Masil SF 19® concentrate, 5–10% by weight, was then added to poly(propylene) and meltblown mat was formed. The mat had fine denier and completely saturated with water.

When wetted with water or acid, the liquid wicks through the entire structure and the liquid is entirely absorbed by the separator. In practice, sufficient acid is added so that 85 to 95% of the void volume is saturated. The remaining space is in the form of an empty interconnected porous structure, allowing transfer of gas between electrodes.

I claim:

1. A battery separator for use between the electrodes of an acid type recombinant battery, said separator comprising an uncompressed mat of thermally bonded meltblown thermoplastic polymer fibers, at least ten percent of said fibers having diameters of less than one micron and at least sixty percent of said fibers having diameters of less than five microns, said fibers having a surface area of greater than 1

$m^2/g$, said mat having a liquid porosity of at least 90 percent and having about five to about fifteen percent void volume after charging with liquid acid to allow transmission of gas, said fibers being treated with an agent to render them wettable in acid, said separator completely absorbing said liquid acid.

2. The battery separator of claim 1 wherein said agent is covalently bonded to said fibers.

3. The battery separator of claim 1 wherein said agent is contained within said fibers.

4. The battery separator of claim 1 wherein said mat contains more than 15% polymer fibers having a diameter of less than one micron.

5. The battery separator of claim 1 wherein said polymer is polypropylene.

6. The battery separator of claim 5 wherein said polypropylene is metallocene polypropylene having a MWD of 1.0 to 3.5.

7. The battery separator of claim 1 wherein said agent is a hydrophilic polymer chemically bonded to said polymer fibers.

8. The battery separator of claim 7 wherein said hydrophilic polymer is photoactivatible.

9. The battery separator of claim 1 wherein said agent comprises polyvinyl pyrrolidine.

10. The battery separator of claim 1 wherein said agent comprises polyacrylamide.

11. The battery separator of claim 1 wherein said separator has a mean pore size of 5 to 15 microns.

* * * * *